United States Patent

Snell et al.

[11] Patent Number: 5,511,641
[45] Date of Patent: Apr. 30, 1996

[54] MECHANICAL BRAKE INTERLOCK MECHANISM FOR A COLUMN-MOUNTED SHIFT CONTROL ASSEMBLY

[75] Inventors: William M. Snell, Grand Blanc; Thomas S. Kaliszewski, Troy; Rodney L. Eaton, Clarkston, all of Mich.

[73] Assignee: Chrysler Corporation, Auburn Hills, Mich.

[21] Appl. No.: 343,052

[22] Filed: Nov. 21, 1994

[51] Int. Cl.⁶ .................................... B60K 41/26
[52] U.S. Cl. ................. 192/4 A; 70/248; 477/96
[58] Field of Search .............. 192/4 A; 477/96, 477/99; 70/248

[56] References Cited

U.S. PATENT DOCUMENTS

| | | | |
|---|---|---|---|
| 4,821,605 | 4/1989 | Dzioba . | |
| 4,932,283 | 6/1990 | Ishigami et al. | 477/99 X |
| 4,991,700 | 2/1991 | Koga | 192/4 A |
| 5,014,831 | 5/1991 | Wawra et al. | 192/4 A |
| 5,027,929 | 7/1991 | Ratke et al. | 477/99 X |
| 5,299,470 | 4/1994 | Snell et al. . | |

*Primary Examiner*—Rodney H. Bonck
*Attorney, Agent, or Firm*—Edward A. Craig

[57] ABSTRACT

A column-mounted shift control assembly. The latter includes a rotatably mounted shift lever unit, a shift handle pivotally mounted on the shift lever unit, and resilient device for urging the terminal end of the shift handle toward a planar gate unit having Park, Reverse, Neutral, Drive, Second and Low detents formed thereon for selective cooperation with the spring-loaded shift handle terminal end to select a desired transmission shift position. A mechanical brake interlock mechanism cooperates with a blocker member pivotally mounted adjacent the terminal end of the shift handle adapted to prevent pivoting of the blocker member away from the terminal end to thus prevent movement of the terminal end of the shift handle out of the Park detent position prior to depression of the commonly used brake pedal.

7 Claims, 4 Drawing Sheets

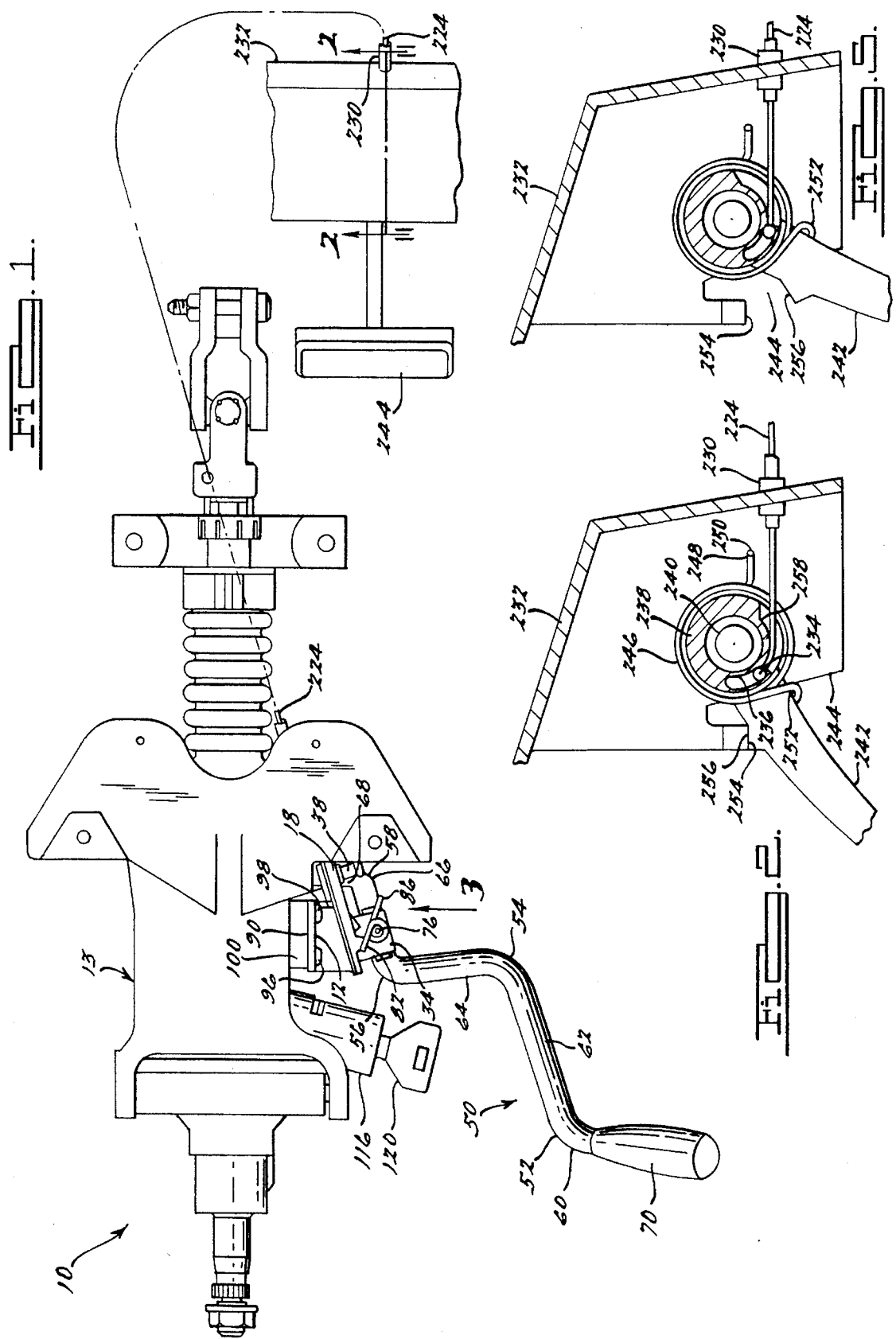

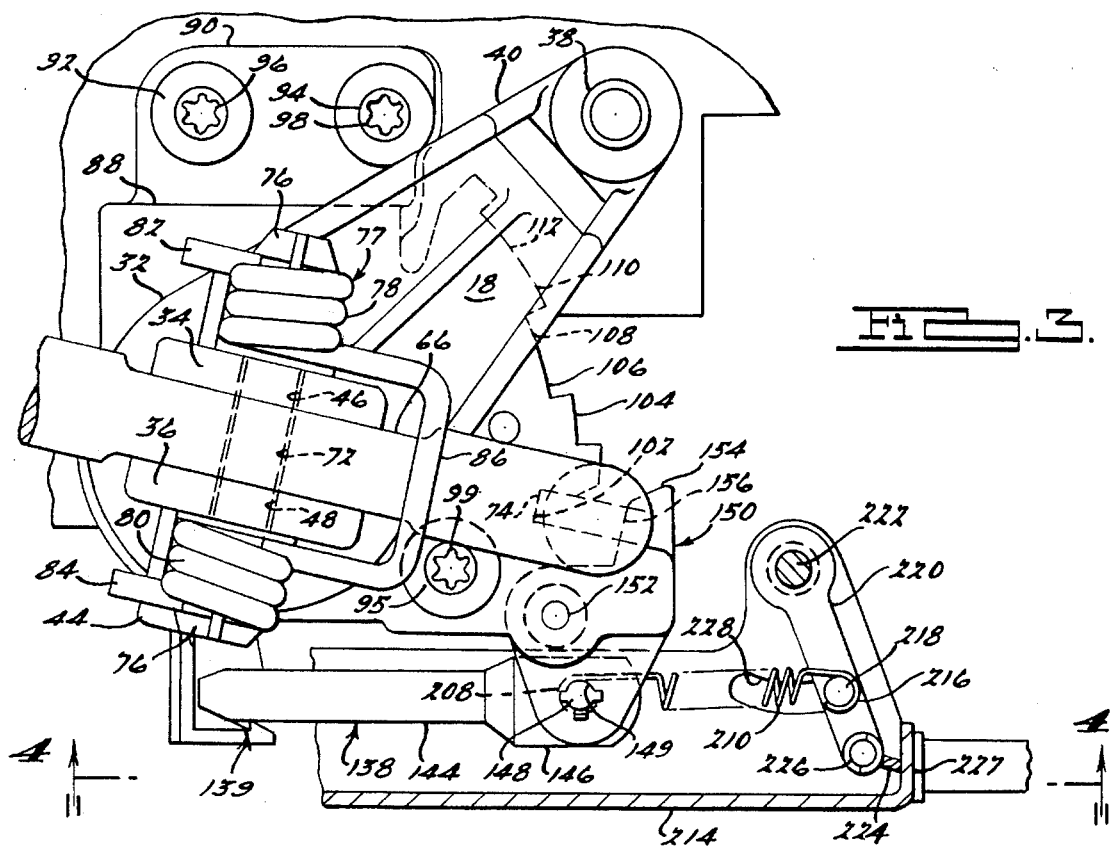
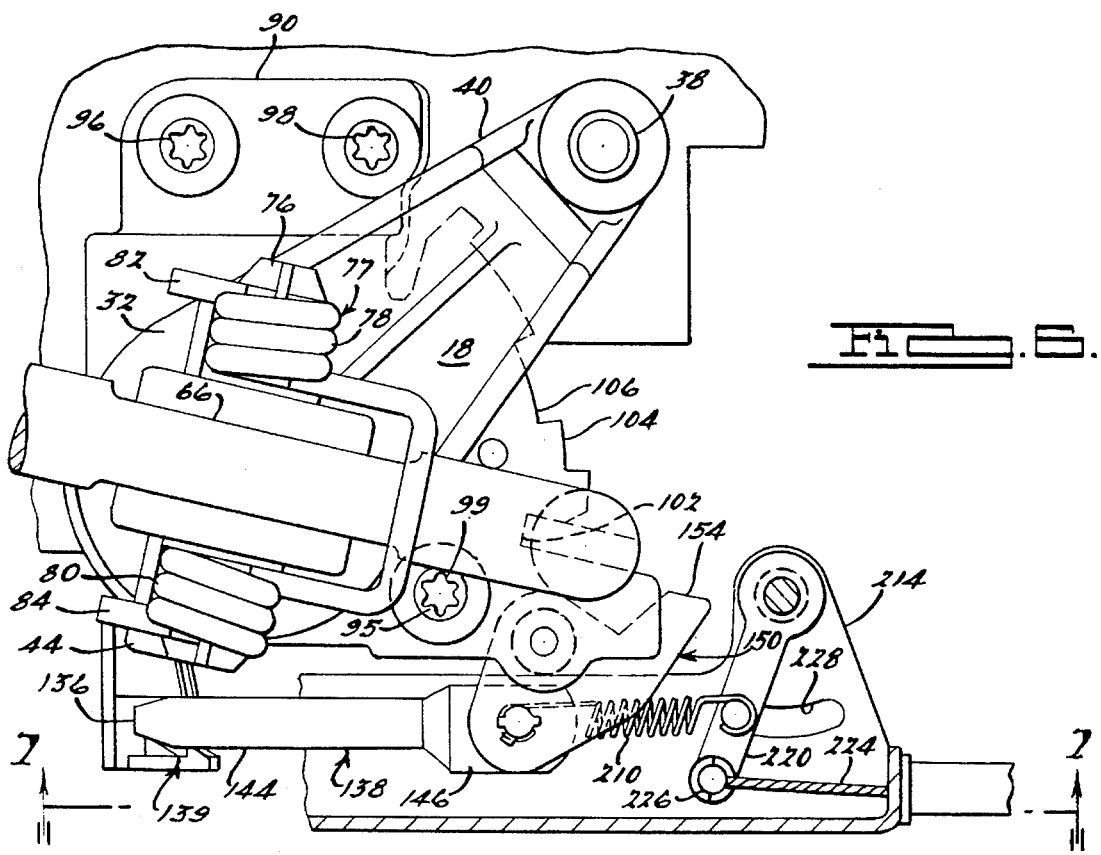

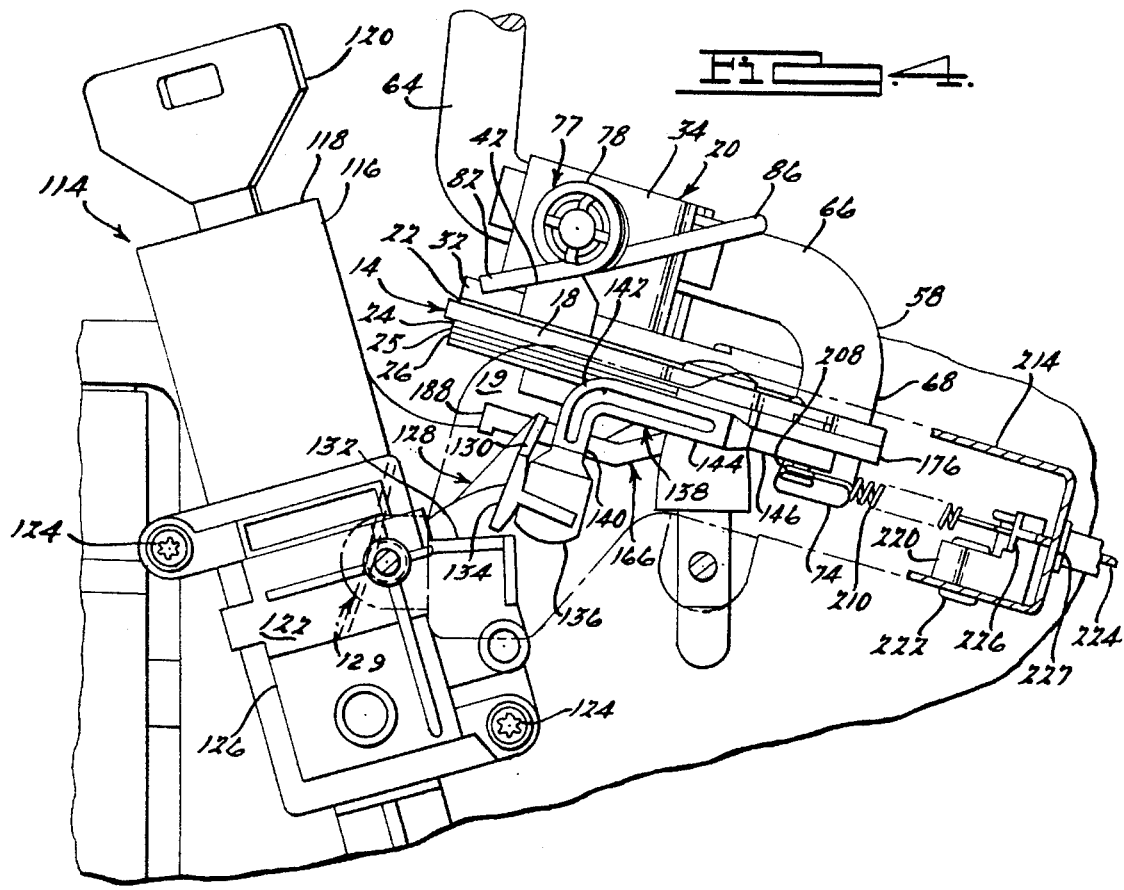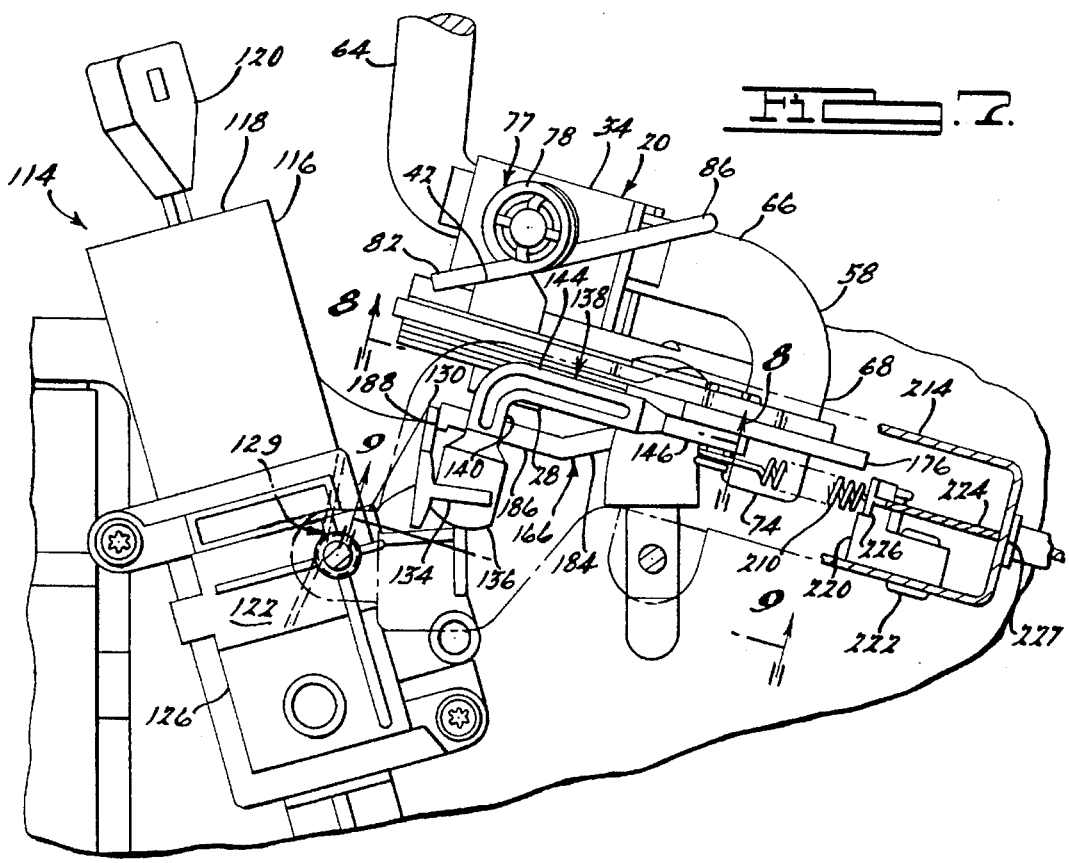

5,511,641

MECHANICAL BRAKE INTERLOCK MECHANISM FOR A COLUMN-MOUNTED SHIFT CONTROL ASSEMBLY

TECHNICAL FIELD

This invention relates generally to vehicle transmission column-mounted shift control assemblies and, more particularly, to a mechanical brake interlock mechanism therefor.

BACKGROUND ART

A known ignition interlock mechanism for a column-mounted shift control assembly is disclosed in Dzioba U.S. Pat. No. 4,821,605. This mechanism includes a latch plate pivotally mounted on an end of an arcuate shaped detent plate. The latch plate has a locking surface which is selectively positioned via the interaction of a key cylinder slot, a lock pin, a ramped plunger, and a cable to prevent removal of an operator lever positioning arm from the Park position prior to the key cylinder being unlocked. The latch plate also includes a positioning surface which, when engaged by the positioning arm upon its return to Park position, will pivot the latch plate to thereby move the plunger and permit the lock pin to leave the key cylinder slot and permit the key to be returned to its lock and remove position.

A further known ignition interlock mechanism for a column-mounted shift control assembly is disclosed in Snell et al U.S. Pat. No. 5,299,470. This mechanism cooperates with the terminal end of the shift handle to prevent its movement out of the Park detent position unless the ignition switch key is turned on, and further prevents the ignition switch from being turned on, and further prevents the ignition switch from being turned back to Lock unless the terminal end is in Park position, thus preventing key extraction, and is substantially covered in the following description.

DISCLOSURE OF THE INVENTION

A general object of the invention is to provide an improved interlock mechanism for a column-mounted vehicle transmission shift control assembly, serving to prevent removal of the shift control mechanism from its Park position prior to the depression of the brake pedal.

Another object of the invention is to provide a mechanical brake interlock mechanism for a column-mounted vehicle transmission shift control assembly including a rotatably mounted shift lever unit, a shift handle pivotally mounted on the shift lever unit, resilient means for urging the terminal end of the shift handle toward a planar gate unit having Park, Reverse, Neutral, Drive, Second and Low detents formed thereon for selective cooperation with the spring-loaded shift handle terminal end to select a desired transmission shift position, a blocker member pivotally mounted adjacent the terminal end of the shift handle, and a spring-loaded cable arrangement between the blocker member and the usual brake pedal adapted to prevent movement of the terminal end of the shift handle out of the Park detent position prior to depression of the brake pedal.

These and other objects and advantages will become more apparent when reference is made to the following drawings and the accompanying description.

BRIEF DESCRIPTION OF THE DRAWINGS

FIG. 1 is front view of a vehicle steering column embodying the invention;

FIG. 2 is a cross-sectional view taken along the plane of the line 2—2 of FIG. 1, and looking in the direction of the arrows;

FIG. 3 is an enlarged end view of a portion of the FIG. 1 structure, as viewed in the direction of the arrow in FIG. 1;

FIG. 4 is a cross-sectional view taken along the plane of the line 4—4 of FIG. 3, and looking in the direction of the arrows;

FIG. 5 is a view similar to FIG. 2, but illustrating a different operational position;

FIG. 6 is a view similar to FIG. 3, but illustrating a different operational position;

FIG. 7 is a cross-sectional view taken along the plane of the line 7—7 of FIG. 6, and looking in the direction of the arrows.

BEST MODE OF CARRYING OUT THE INVENTION

Figure 8:
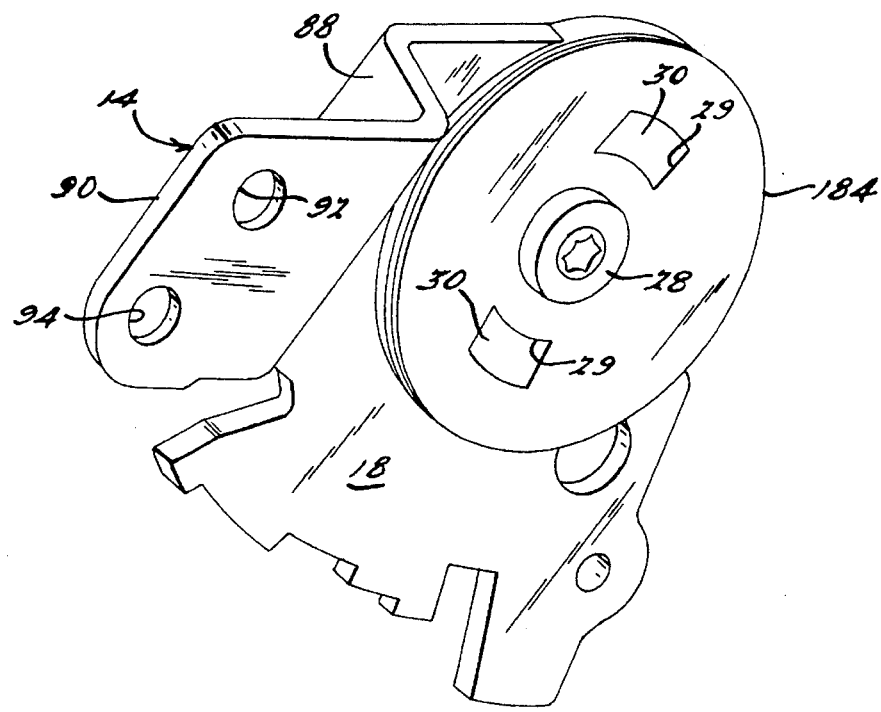
FIGS. 8 and 9 are cross-sectional views taken along the planes of the lines 8—8 and 9—9 of FIG. 7, respectively, and looking in the directions of the arrows.
Figure 9:
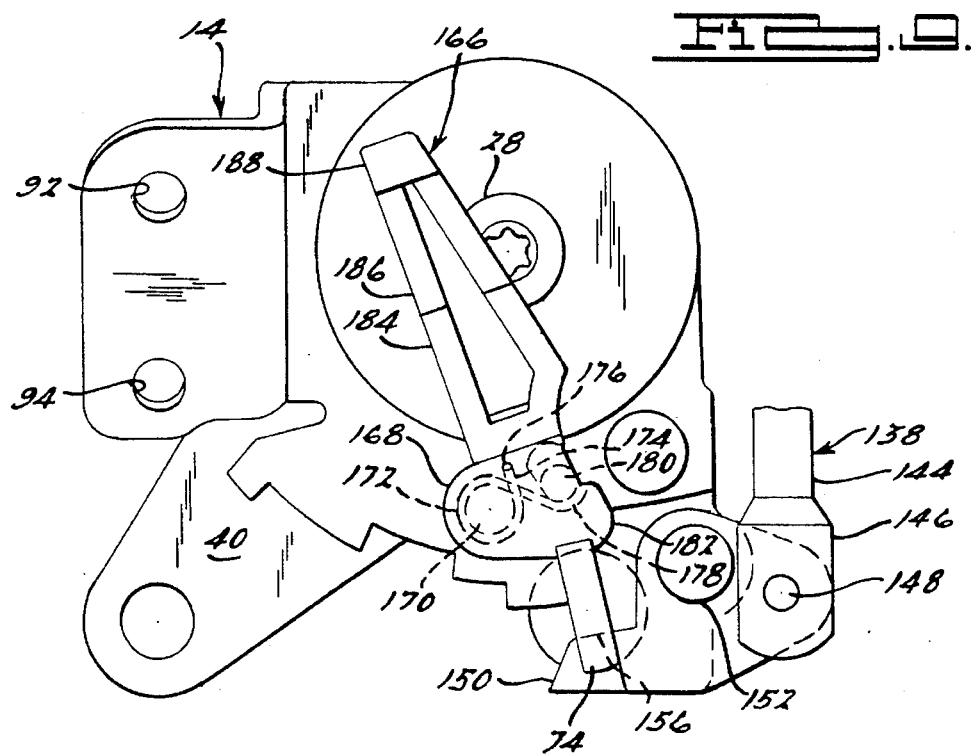

Referring now to the drawings in greater detail, FIGS. 1–7 illustrate a vehicle gear shift mechanism 10 mounted on a predetermined surface 12 of a steering column 13 (FIG. 1). The gear shift mechanism 10 includes an integral gate and mounting bracket 14 having a mounting opening, not shown, formed in a planar body portion 18, and mounted around a cylindrical hub 19 extending from a shift lever unit 20. As shown in FIG. 4, the planar body portion 18 is confined between two wear washers 22 and 24. A wave washer 25 is confined between the wear washer 24 and a flat steel washer 26. The planar body portion 18 is retained on the hub 19 by the washer 24/25/26 arrangement which, in turn, are retained on the hub 19 by an attaching screw 28 (FIG. 8), and anti-rotational holes 29 and cooperating projections 30 formed on the shift lever unit 20.

The wear bushing 22 abuts against a partially round body portion 32 of the shift lever unit 20. A pair of spaced-apart mounting flanges 34 and 36 (FIG. 3) are formed on the body portion 32, on the side opposite the wear bushing 22, so as to extend perpendicularly therefrom.

A shift cable mounting lug 38 (FIGS. 3 and 6) is provided adjacent the end of an elongated extension 40 of the body portion 32. A pair of spring retainer abutments 42 (FIG. 4) and 44 (FIG. 3) are formed on the body portion 32, extending outwardly from the respective flanges 34 and 36. A pair of aligned openings 46 and 48 are formed through a central portion of the respective flanges 34 and 36.

A shift lever 50 (FIG. 1) includes bend portions 52, 54, 56, and 58 formed along its length to provide segments 60, 62, 64, 66, and 68. A hand grip 70 is provided on the first end segment 60, and a hole 72 is formed through the segment 66. A flat-sided terminal end 74 (FIGS. 4 and 7) is formed on the distal end of the segment 68, for a purpose to be described.

A spring mounting pin 76 is extended through the opening 46, the hole 72, and the opening 48. A spring assembly 77 (FIGS. 3 and 6) includes a pair of coil springs 78 and 80 mounted around the respective extended ends of the pin 76. An outer end coil 82 and 84 of the respective coil springs 78 and 80 is straightened to abut against the respective spring retainer abutments 42 and 44, and a central U-shaped wire portion 86 extends from the respective inner coils of the springs 78 and 80. The U-shaped wire portion 86 is urged in tension against the outer surface of the shift handle segment 66 by the abutting outer straightened coils 82 and 84, for a purpose to be described.

The integral gate and mounting bracket 14 is formed to include a segment 88 (FIGS. 3 and 6) bent outwardly from the planar body portion 18, with a mounting flange 90 bent substantially perpendicularly from the outer end of the segment 88. A pair of mounting holes 92 and 94 are formed through the flange 90, and a third hole 95 through the planar body portion 18. A pair of metal screws 96 and 98 (FIG. 1) are mounted through the holes 92 and 94 and a screw 99 (FIG. 3) is mounted through the hole 95 to secure the gear shift mechanism 10 to a mounting block 100 (FIG. 1) on the steering column 13.

A plurality of gate detents 102, 104, 106, 108, 110, and 112 (FIGS. 3 and 6), corresponding to Park, Reverse, Neutral, Drive, Second and Low gear shift positions, respectively, are formed on an edge of the planar body portion 18 of the gate and mounting bracket 14.

As shown in FIG. 3, the flat terminal end 74 of the shift handle 50 is adapted to extend through the Park detent 102, being retained thereagainst by the force of the central U-shaped wire portion 86 of the spring assembly 77.

As shown in FIGS. 4 and 7, an interlock latching mechanism 114 includes a cylindrical housing 116 enclosing a key cylinder 118, into which a key 120 is inserted and adapted to rotate the key cylinder within the housing 116. A cover 122 is secured by fasteners 124 over a housing 126 adjacent the inner end of the key cylinder 118.

A spring-loaded flip cam is pivotally mounted in the housing 126 beneath the cover 122. A projection 130 of the flip cam 128 extends through an Opening 132 and urged upwardly by a spring, represented at 129 in FIG. 4. A laterally extending extension 134 is formed on the end portion of the projection 130. An end portion 136 of a linkage rod 138 is pivotally connected by a pivot arrangement 139, shown best in FIGS. 3 and 8, to the distal end of the extension 134.

The linkage rod 138 includes a first segment 140 (FIGS. 4 and 7) extending from the end portion 136 to a bend 142. A second segment 144 extends from the bend 142 to a flat terminal end 146. The latter is secured by a projection 148 into an opening 149 in a blocker member 150. The blocker member 150 is pivotally mounted on a pivot pin 152 through the planar body portion 18 adjacent the Park detent 102. An extension 154 is formed on an end of the blocker member 150, adaptable to being pivoted into a slot 156 formed in an edge of the flat terminal end 74 of the shift handle 50.

A key inhibit blocker 166 is pivotally mounted at one perforated end 168 thereof by a pivot pin 170 secured to the bracket 14. A spring 172 is mounted around the pin 170, with one extended end 174 bent into a hole 176 in the blocker 166, and the other extended end 178 hooked around a fixed pin 180. The key inhibit blocker 166 is formed to include an abutment 182 adjacent the perforated end 168, a leg 184 which includes an intermediate bend 186 adapted to pass over the attaching screw 28, and a distal end 188.

As shown in FIGS. 3, 4, 6 and 7, an end 208 of a spring 210 is secured by the projection 148 adjacent the end 146 of the linkage rod 138 within a housing 214. The other end 216 of the spring 210 is secured to a mounting pin 218 connected at a midpoint of a lever 220. The lever 220 is pivotally connected at one end thereof by a pivot pin 222 fixed on a wall of the housing 214. A brake cable 224 is connected by a fastener 226 to the other end of the lever 220, and extends through an opening 227 in the housing 214. The mounting pin 218 extends through an arcuate slot 228 formed in a wall of the housing 214.

Referring now to FIGS. 1-3, the cable 224 extends through a fitting 230 into a brake pedal housing 232 where the end of the cable is secured to a pin 234 mounted in an over-travel clearance slot 236 formed in a disc 238. The disc 238 is pivotally mounted on a pin 240. A brake lever 242 is secured at one end thereof to the disc 238, extending out through an opening 244 in the housing 232. A foot pedal 244 (FIG. 1) is secured to the other end of the lever 242 for actuation by the driver. A return spring 246 is mounted around the disc 238, with one end 248 thereof fixed in an opening 250 in the housing 232. The other end 252 of the return spring 246 is mounted around the end of the lever 242.

As shown in FIGS. 2 and 5, an abutment 254 is formed in the housing 232 at an edge of the opening 244. A tapered protrusion 256 is formed on the brake lever 242, adapted to be urged by the spring end 252 around the lever into engagement with the abutment 254 when the foot pedal 244 (FIG. 1) is released. A relief portion 258 is formed in an edge portion of the disc 238 to accommodate the movement of the cable 224 through the operational movements of the disc.

In operation, so long as the brake pedal 244 is not depressed, the spring 210 is in tension, pulling on the blocker member 150 about pivot pin 152, to thereby retain the extension 154 of the blocker member in the slot 156 when the flat-sided terminal end 74 of the shift handle 50 is in the Park detent 102. As such, the shift lever is blocked from being pivoted out of the Park detent 102.

Once the brake pedal 244 and lever 242 are depressed, the cable 224 load is released, allowing the spring 210 to compress (FIG. 6), thereby freeing the pull on the blocker member 150 and, hence, freeing the terminal end 74 of the shift handle 50. Thereafter, the usual ignition interlock mechanism is now free to be operated as described in Snell et al U.S. Pat. No. 5,299,470, relative to the embodiment of FIGS. 8–12 thereof.

Specifically, while the brake pedal 244 is depressed, with the key 120 in the Park mode, the blocker member 150 serves to prevent the shift lever terminal end 74 from being shifted out of the Park detent 102 by virtue of the position of the flip cam 128 holding the lateral extension 134 thereof downwardly to push the linkage rod 138 down, thereby pivoting the extension 154 of the blocker member 150 upwardly into engagement with the slot 156 in the shift handle terminal end 74. When the key 120 is turned out of its Park position, the lateral extension 134 and linkage rod 138 are lifted, pivoting the blocker member 150 and pulling the extension 154 thereof away from the shift handle terminal end 74, thus freeing the shift handle 50 for movement into any other selected detent 104-112.

Under the prior arrangement also, so long as the shift lever 50 is out of the Park detent 102, the key inhibit blocker 166 is pivoted by the spring 172 (FIG. 9) to a position wherein the end 188 thereof is pivoted to a position beneath the projection 130 so as to block any downward movement of the lateral extension 134 of the flip cam 128, thereby preventing the key 120 from being returned to its Low position. Hence, the key 120 cannot be removed from the key cylinder 118 until the shift lever terminal end 74 is once again returned to the Park detent 102, during which motion the terminal end 74 abutment 182 (FIG. 9) of the key inhibit blocker 166 and pivots the latter, against the force of the spring 172, away from the downward path of the lateral extension 134 of the flip cam 128. Thus, the key 120 can be returned to Park and removed from the cylinder 118.

While the upper end 188 of the key inhibit blocker 166 is beneath the projection 130 of the flip cam 128, the blocker member 150 is held away from the Park detent 102 by virtue of the linkage rod 138 being held upwardly, as just described. As such, the force of the spring 210 is overcome, thus preventing the blocker member 150 from being in the path of the shift lever terminal end 74 while it is being returned to the Park detent 102 position. It is after the key inhibit blocker 166 is pivoted, as described above, by the returning terminal end 74 that the spring 210 is thereafter able to pivot the blocker member 150 into the slot 156 in the terminal end 74, overcoming the spring 129 force in the housing 126 on the flip cam 128, even before the key 120 is returned to Park, to urge the linkage rod 138 downwardly and the blocker member extension 154 upwardly in the usual manner.

Industrial Applicability

It should be apparent that the invention provides a compact and efficient mechanical brake interlock mechanism which cooperates with and is readily adapted to an ignition interlock mechanism to prevent the shift handle's terminal end portion from being lifted out of and pivoted away from the usual Park detent position to other desired transmission shift positions until the vehicle's brake pedal is depressed by the operator.

While but one embodiment of the invention has been shown and described, other modifications thereof are possible within the scope of the following claims.

What is claimed is:

1. In a transmission shift control assembly including a detent plate having a plurality of detents formed thereon including a Park detent, a shift lever having an end thereof pivotable into and out of the Park detent and rotatable to selected detents, a pivotally mounted spring-loaded flip cam, a blocker member pivotally mounted on said detent plate, a linkage member operatively connected between said flip cam and said blocker member adapted to selectively pivot said blocker member into and out of engagement with the end of the shift lever while the shift lever is in the Park detent position, a brake lever and associated brake pedal, and a spring for urging the brake lever from a depressed state to an undepressed state, a mechanical brake interlock mechanism comprising spring-loaded cable means operatively connected between said brake lever and said blocker member to prevent said blocker member from being pivoted away from said end of said shift lever until said brake pedal is depressed, said spring-loaded cable means including a spring connected to said blocker member, and a cable operatively connected between said spring and said brake lever.

2. The mechanical brake interlock mechanism described in claim 1, wherein said shift control assembly further includes a key cylinder rotatable by a key, and the flip cam is adapted to being pivoted upon rotation of the key cylinder by the key, and while said brake pedal is depressed, the load on said cable and, hence, on said spring is relaxed such that, upon rotation of said key, said flip cam moves said linkage member to, in turn, move said blocker member away from said end of said shift lever such that the shift lever can be pivoted out of said Park detent.

3. In a transmission shift control assembly including a detent plate having a plurality of detents formed thereon including a Park detent, a shift lever having an end thereof pivotable into and out of the Park detent and rotatable to selected detents, a pivotally mounted spring-loaded flip cam, a blocker member pivotally mounted on said detent plate, a linkage member operatively connected between said flip cam and said blocker member adapted to selectively pivot said blocker member into and out of engagement with the end of the shift lever while the shift lever is in the Park detent position, a brake lever and associated brake pedal, and a spring for urging the brake lever from a pressed state to an undepressed state, a mechanical brake interlock mechanism comprising spring-loaded cable means operatively connected between said brake lever and said blocker member to prevent said blocker member from being pivoted away from said end of said shift lever until said brake pedal is depressed, said spring-loaded cable means including a disc rotatable by said brake lever, a spring connected at one end thereof to said blocker member and at the other end thereof to a pivotally mounted lever, and a cable connected between said pivotally mounted lever and said disc.

4. The mechanical brake interlock mechanism described in claim 3, wherein said spring for urging the brake lever from a depressed state to an undepressed state is a coil spring mounted around said disc with one end fixed remotely therefrom, and the other end formed around said brake lever to lift same when the brake lever is not depressed.

5. The mechanical brake interlock mechanism described in claim 4, wherein said coil spring urges said brake lever into engagement with a fixed abutment.

6. The mechanical brake interlock mechanism described in claim 3, wherein an overtravel clearance slot is formed in said disc, a pin is mounted in said slot, and an end of said cable is connected to said pin.

7. The mechanical brake interlock mechanism described in claim 3, and a housing having one end of said pivotally mounted lever pivotally mounted therein, an arcuate-shaped slot formed in said housing, a mounting pin extending through an opening formed through a midpoint of said pivotally mounted lever and into said arcuate-shaped slot and having said other end of said spring connected to said mounting pin, with an end of said cable secured to the distal end of said pivotally mounted lever.

* * * * *